(12) United States Patent
Bergeal et al.

(10) Patent No.: US 12,129,778 B2
(45) Date of Patent: Oct. 29, 2024

(54) SYSTEM COMPRISING VEHICULAR COMPRESSION IGNITION ENGINE AND AN EMISSIONS CONTROL DEVICE COMPRISING AN ELECTRICALLY HEATABLE ELEMENT

(71) Applicant: JOHNSON MATTHEY PUBLIC LIMITED COMPANY, London (GB)

(72) Inventors: David Bergeal, Royston (GB); Andrew Chiffey, Royston (GB); Daniel Hatcher, Royston (GB); Francois Moreau, Royston (GB); Paul Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 18/472,272

(22) Filed: Sep. 22, 2023

(65) Prior Publication Data
US 2024/0011421 A1    Jan. 11, 2024

Related U.S. Application Data

(63) Continuation of application No. 17/597,854, filed as application No. PCT/EP2020/071902 on Aug. 4, 2020, now Pat. No. 11,808,190.

(30) Foreign Application Priority Data

Aug. 8, 2019  (EP) ..................... 19190856

(51) Int. Cl.
*F01N 3/08*    (2006.01)
*B01D 53/94*   (2006.01)
(Continued)

(52) U.S. Cl.
CPC ....... *F01N 3/0835* (2013.01); *B01D 53/9418* (2013.01); *B01D 53/9431* (2013.01);
(Continued)

(58) Field of Classification Search
CPC ............ B01D 53/9418; B01D 53/9431; B01D 53/944; B01D 53/9477; B01D 53/9486;
(Continued)

(56) References Cited

U.S. PATENT DOCUMENTS 5,804,148 A   9/1998 Kanesaka
6,318,076 B1  11/2001 Kim
(Continued)

FOREIGN PATENT DOCUMENTS

DE        19963681 B4   7/2004
DE     102009034086 A1  5/2010
(Continued)

*Primary Examiner* — Dapinder Singh
(74) *Attorney, Agent, or Firm* — BakerHostetler

(57) ABSTRACT

A system comprising (i) a vehicular compression ignition engine comprising one or more engine cylinders and one or more electronically-controlled fuel injectors therefor; (ii) an exhaust line for the engine comprising: a first emissions control device comprising a first honeycomb substrate, which comprises a hydrocarbon adsorbent component; and a second emissions control device comprising an electrically heatable element and a catalysed second honeycomb substrate, which comprises a rhodium-free platinum group metal comprising platinum, wherein the electrically heatable element is disposed upstream from the catalysed second honeycomb substrate and wherein both the electrically heatable element and the catalysed second honeycomb substrate are disposed downstream from the first honeycomb substrate; a third emissions control device, which is a third honeycomb substrate comprising an ammonia-selective catalytic reduction catalyst disposed downstream from the second emissions control device; and one or more tempera- (Continued)

ture sensors located: upstream of the electrically heatable element and/or upstream of the first honeycomb substrate; and between the electrically heatable element and the catalysed second honeycomb substrate; and (iii) an engine control unit comprising a central processing unit pre-programmed, when in use, to control both a heating activation state of the electrically heatable element; an injection timing strategy of the one or more electronically-controlled fuel injector to increase the temperature of at least the first emissions control device following key-on/cold-starting a vehicle comprising the system, wherein the one or more temperature sensors are electrically connected to the engine control unit for feedback control in the system.

6 Claims, 1 Drawing Sheet

(51) Int. Cl.
*F01N 3/20* (2006.01)
*F01N 3/28* (2006.01)
*F01N 13/00* (2010.01)
*F02D 41/02* (2006.01)
*F02D 41/40* (2006.01)
*F02D 41/38* (2006.01)

(52) U.S. Cl.
CPC ....... *B01D 53/944* (2013.01); *B01D 53/9477* (2013.01); *B01D 53/9486* (2013.01); *B01D 53/9495* (2013.01); *F01N 3/0842* (2013.01); *F01N 3/2013* (2013.01); *F01N 3/2066* (2013.01); *F01N 3/2803* (2013.01); *F01N 3/2842* (2013.01); *F01N 13/009* (2014.06); *F02D 41/024* (2013.01); *F02D 41/401* (2013.01); *B01D 2255/1021* (2013.01); *B01D 2255/1023* (2013.01); *F01N 2370/02* (2013.01); *F02D 2041/389* (2013.01)

(58) Field of Classification Search
CPC ........ B01D 53/9495; B01D 2255/1021; B01D 2255/1023; F01N 3/00; F01N 3/0835; F01N 3/0842; F01N 3/2006; F01N 3/2013; F01N 3/2033; F01N 3/2066; F01N 3/2803; F01N 3/2842; F01N 13/009; F01N 2240/16; F01N 2240/18; F01N 2370/02; F01N 2430/06; F01N 2610/03; F02D 41/024; F02D 41/0245; F02D 41/025; F02D 41/0255; F02D 41/401; F02D 41/405; F02D 2041/389; F02D 2200/0802; Y02A 50/20; Y02T 10/12; Y02T 10/40
See application file for complete search history.

(56) References Cited

U.S. PATENT DOCUMENTS

| | | | |
|---|---|---|---|
| 6,401,450 B1 * | 6/2002 | Hoshi | F01N 11/002 60/284 |
| 8,168,125 B2 | 5/2012 | Choi | |
| 8,544,258 B2 * | 10/2013 | Brown | F01N 3/106 60/284 |
| 2011/0192138 A1 * | 8/2011 | Bailey | F01N 11/00 60/274 |
| 2011/0258984 A1 * | 10/2011 | Santoso | F01N 3/2006 60/274 |
| 2014/0060014 A1 * | 3/2014 | Gonze | F01N 3/106 60/286 |
| 2018/0171850 A1 * | 6/2018 | Aydin | F01N 13/0097 |

FOREIGN PATENT DOCUMENTS

| | | |
|---|---|---|
| JP | 06241031 B2 | 8/1994 |
| WO | 2010050857 A1 | 5/2010 |

* cited by examiner

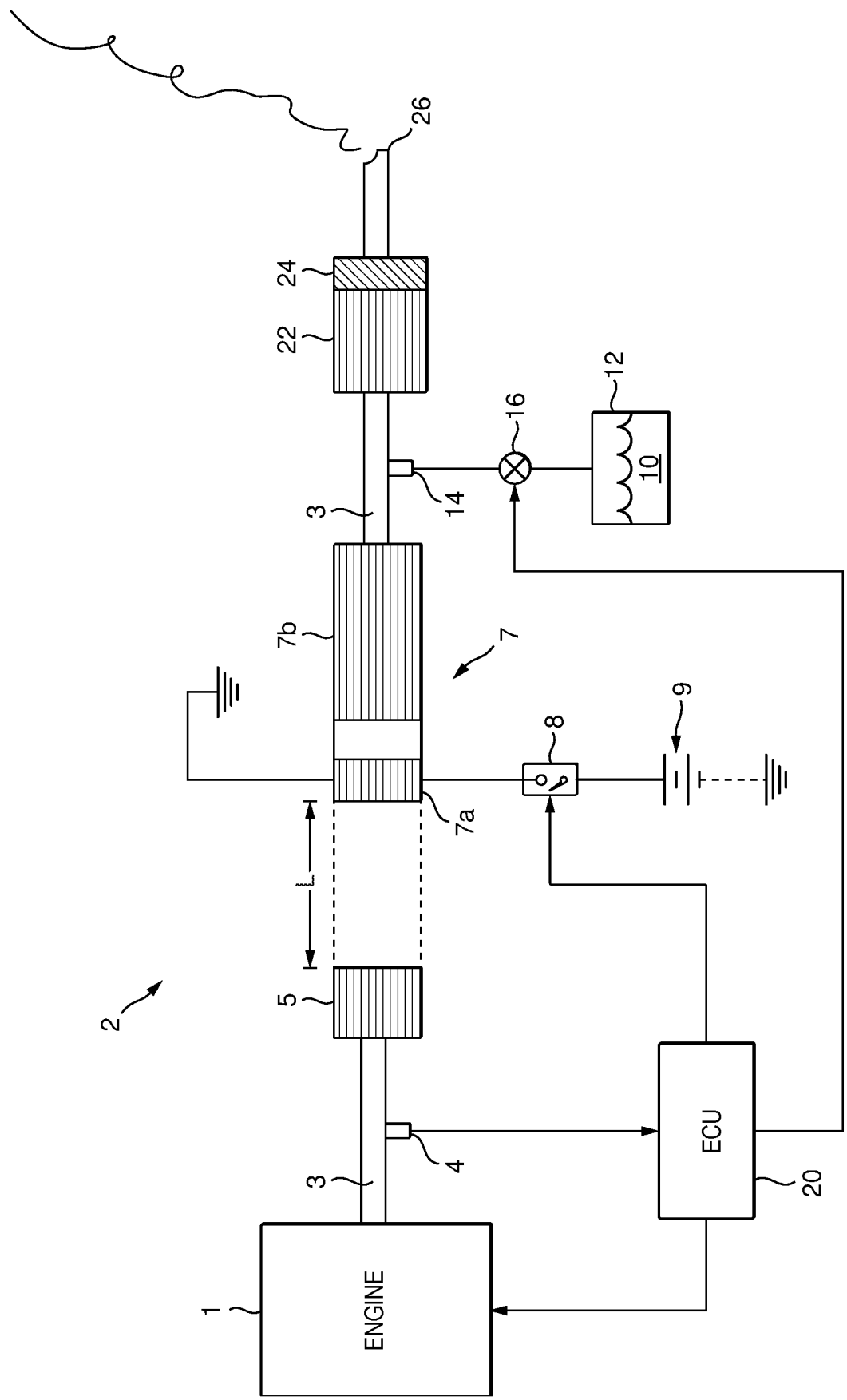

SYSTEM COMPRISING VEHICULAR COMPRESSION IGNITION ENGINE AND AN EMISSIONS CONTROL DEVICE COMPRISING AN ELECTRICALLY HEATABLE ELEMENT

FIELD OF THE INVENTION

The invention relates to a system comprising a vehicular compression ignition engine and an exhaust line therefor, wherein the exhaust line comprises an emissions control device comprising an electrically heatable element and a catalysed honeycomb substrate downstream therefrom and an engine control unit comprising a central processing unit pre-programmed, when in use, to control a heating activation state of the electrically heatable element. The invention also relates to a vehicle comprising the system and to a method for treating an exhaust gas stream containing unburned hydrocarbons and oxides of nitrogen ($NO_x$) emitted from a vehicular compression ignition engine.

BACKGROUND TO THE INVENTION

Compression ignition engines produce exhaust gas emissions that generally contain at least four classes of pollutant that are legislated against by inter-governmental organisations throughout the World: carbon monoxide (CO); unburned hydrocarbons (HCs); oxides of nitrogen ($NO_x$); and particulate matter (PM). Emissions control devices known as oxidation catalysts (or diesel oxidation catalysts) are commonly used to treat carbon monoxide (CO) and hydrocarbons (HCs), including the volatile organic fraction (VOF) of particulate matter (PM), in exhaust emissions produced by compression ignition engines. Such catalysts treat carbon monoxide (CO) by oxidising it to carbon dioxide ($CO_2$), and treat hydrocarbons (HCs) by oxidising them to water ($H_2O$) and carbon dioxide ($CO_2$).

Oxidation catalysts for compression ignition engines typically comprise platinum group metals (PGMs) and a refractory oxide support material, which are coated onto a substrate. However, oxidation catalysts take several minutes to heat up to their effective operating temperature from a cold start, and in that time a significant quantity of pollutants can be emitted into the air.

One way of bringing the oxidation catalyst up to its effective operating temperature is to incorporate an electrical heater into the exhaust system or the emissions control device. For example, Applicant's EP 0579415 A1 describes an upstream heater for a catalyst in an exhaust system. The exhaust system in EP0579415 A1 contains a catalyst for the treatment of exhaust gas to combat air pollution, and a non-catalytic heater upstream of the catalyst to reduce the time it takes the catalyst to reach its effective reaction temperature. The heater has at least 15 heated channels per square cm, as measured at right angles to the gas flow therethrough, the heated channels being less than 1.0 cm in length, so that in operation the gas passes through the channels and is thereby heated before it reaches the catalyst.

Applicant's WO 2017/168156 discloses an exhaust system comprising: a $NO_x$ storage catalyst; an electric heating element; and a $NO_x$ reduction catalyst wherein the heating element is located downstream of the $NO_x$ storage catalyst.

Applicant's WO 2015/040396 discloses an emissions control device for a compression ignition engine. The emissions control device comprises: (a) a first catalyst comprising an electrically heatable substrate and a first composition disposed on the electrically heatable substrate, wherein the first composition comprises alumina and a first platinum group metal (PGM); and (b) a second catalyst comprising a substrate and a second composition disposed on the substrate, wherein the second composition comprises alumina and a second platinum group metal (PGM); wherein the loading of the first composition is less than the loading of the second composition.

FR 3072417A1 discloses an oxidation catalyst with electric heating for mounting in an exhaust line of a combustion engine comprising a heating element and a matrix wherein one of the heating element and the matrix is impregnated with palladium and the other component is impregnated with palladium and platinum.

SUMMARY OF THE INVENTION

As emission legislation for vehicles continues to tighten around the World including, among others, those having compression ignition engines in their power train, there is an increasing need to reduce carbon dioxide and other pollutant emissions throughout a vehicle's duty cycle, i.e. between key-on and key-off, including immediately from key-on/cold-start.

This can be seen from new emission regulations being brought in in Europe, for example. In Europe from 1 Sep. 2019, all new passenger cars introduced onto the European market for the first time are to be tested according to a new regulation called the "REAL Driving Emissions" (RDE) test. The RDE test is a more realistic on-road emissions test in real driving conditions, for $NO_x$ and other particulate emissions, which are a major cause of air pollution. This test is carried out with a portable emission measuring system (PEMS) that is attached to the car while driving in real conditions on the road.

Additionally, a new laboratory-based test called the World Harmonised Light Vehicles Test Procedure (WLTP) was recently implemented to replace the outgoing "new European Driving Cycle" (NEDC) as the European vehicle homologation procedure. The WLTP is a global, harmonised standard for determining the levels of pollutants, $CO_2$ emissions and fuel consumption of traditional and hybrid cars and was developed by the United Nations Economic Commission for Europe (UNECE). One of the main goals of the WLTP is to better match the laboratory estimates of fuel consumption and emissions with those found in on-road driving.

All new vehicle registrations from 1 Sep. 2019 will be required to meet a $NO_x$ conformity factor of 2.1, whereby the RDE $NO_x$ emissions results cannot exceed the laboratory WLTP $NO_x$ emission results by more than 2.1. In a second phase, this conformity factor will be reduced to 1.43 by January 2020 for all new models (January 2021 for all new vehicle registrations).

Furthermore, the WLTP ties in with European Regulation 2009/443 to set manufacturer-specific targets according to a limit-value line, proportional to the sales-weighted average mass of their fleet and a target of fleet-wide sales weighted average CO 2 emissions from passenger cars to 95 g $CO_2$/km for 2021.

The present invention seeks to meet such challenges by integrating two or more known emissions control devices one of which being a combined electrically heatable element/catalyst substrate of the kind disclosed in U.S. Pat. No. 6,513,324, together with a control strategy for the electrically heatable element in combination with catalyst location and catalyst formulation, within a system, thus providing synergistic interactions between the two or more emissions control devices in the system to achieve an overall reduction in at least one of $CO_2$, hydrocarbon, carbon monoxide and $NO_x$ emissions over the laboratory-based WLTP test cycle (WLTC) and/or RDE test cycles for a particular vehicle.

According to a first aspect, the present invention provides a system comprising: (i) a vehicular compression ignition engine comprising one or more engine cylinders and one or more electronically-controlled fuel injectors therefor; (ii) an exhaust line for the engine comprising: a first emissions control device comprising a first honeycomb substrate, which comprises a hydrocarbon adsorbent component; and a second emissions control device comprising an electrically heatable element and a catalysed second honeycomb substrate, which comprises a substantially rhodium-free platinum group metal (PGM) comprising platinum, wherein the electrically heatable element is disposed upstream from the catalysed second honeycomb substrate; and (iii) an engine control unit comprising a central processing unit pre-programmed, when in use, to control both a heating activation state of the electrically heatable element; and an injection timing strategy of the one or more electronically-controlled fuel injector to increase the temperature of at least the first emissions control device following key-on/cold-starting a vehicle comprising the system.

The catalysed second honeycomb substrate can be substantially free of hydrocarbon adsorbent material, such as substantially free of zeolite.

Essentially, the system of the first aspect of the present invention is intended to achieve integration of three processes: (i) the swift promotion of light-off of catalysts in the exhaust line so that the exhaust line is able to convert hydrocarbons, carbon monoxide, particulate matter and/or oxides of nitrogen as rapidly as possible after key-on/cold-start; (ii) to convert post-injection hydrocarbons introduced by the injection timing strategy (see explanation hereinbelow) used to increase temperature in the engine at key-on/cold-start thereby to increase temperature in the exhaust line in (i); and (iii) to generate $NO_2$ as quickly and efficiently as possible in exhaust gas containing increased quantities of hydrocarbons from the post-injection heat-up strategy in (ii) to promote $NO_x$ and/or particulate matter conversion as rapidly as possible following key-on/cold-start.

An important aspect of the present invention is to enable optimisation of the at least first and second emission control devices in the system around a chosen pre-programmed engine-mapping calibration to control the heating activation state of the electrically heatable element so that the system as a whole can achieve the lowest possible balance of $CO_2$, hydrocarbon, carbon monoxide and $NO_x$ emissions over the laboratory-based WLTP test cycle (WLTC) and/or RDE test cycles for a particular vehicle. In this regard, it can be desirable to achieve a relatively stable exhaust gas temperature exiting the downstream catalysed second honeycomb substrate, e.g. approximately 250° C. for downstream emissions control devices—preferably a SCR catalyst or SCR catalysed filter—to be maintained at a stable inlet temperature to promote efficient $NO_x$ conversion, e.g. approximately 200° C. to 300° C. This can be achieved by actuation of the electrically heatable element or both the electrically heatable element and after-injection, each under the control of the pre-programmed central processing unit of the engine control unit.

The present invention is preferably directed, though not exclusively, to "light-duty diesel vehicles" (LDV). LDVs are defined in US or European legislation. In the US, a light-duty diesel vehicle (LDV) refers to a diesel vehicle having a gross weight of 8,500 pounds (US lbs).

In Europe, a light-duty diesel vehicle is defined as a vehicle in the categories $M_1$, $M_2$, $N_1$ and $N_2$ with a reference mass of ≤2610 kg (EU5/6).

In USA, a heavy-duty diesel vehicle (HDV) as defined in legislation, is a diesel vehicle having a gross vehicle weight rating of >8,500 pounds (US lbs) in the Federal jurisdiction and above 14,000 pounds in California (model year 1995 and later).

In Europe, a heavy-duty diesel vehicle is a vehicle designed and constructed for the carriage of goods and having a maximum mass (i.e. "maximum technically permissible laden mass") of more than 3.5 tonnes (i.e. metric tons) but either not exceeding 12 tonnes ($N_2$ category) or exceeding 12 tonnes ($N_3$ category), i.e. trucks; or a vehicle designed and constructed for the carriage of passengers comprising more than 8 seats in addition to the driver's seat and having a maximum mass either not exceeding 5 tonnes ($M_2$ category); or exceeding 5 tonnes ($M_3$ category), i.e. buses and coaches, according to EU legislation (Council Directive 2007/46/EC). China broadly follows the European definition.

In Japan, an LDV is a passenger car of vehicle weight of <1265 kg or >1265 kg. Depending on the weight range, different emission standards apply. An HDV in Japan is a heavy commercial vehicle defined as having a gross vehicle weight >7500 kg.

In Russia, the emission standards for light and heavy-duty vehicles are based on the European standards and so the above definitions for Europe apply. In South Korea, the emission standards for USA apply for light-duty diesel vehicles and for Europe for heavy-duty diesel vehicles.

In Brazil, an HDV is a motor vehicle for the transportation of passengers and/or goods, with a maximum gross vehicle weight higher than 3,856 kg or a vehicle curb weight higher than 2,720 kg.

In India, an HDV is a vehicle of gross vehicle weight >3,500 kg. For LDVs the definitions follow those in Europe.

Modern diesel engines from light-duty vehicles include electronically controlled fuel injection systems, such as common rail fuel injection, and central processing units of engine control units pre-programmed, when in use, variably to control fuel injection timing for, among other reasons, emissions control. These arrangements allow for the application of such processes as multiple injections during one engine cycle. As the name suggests, multiple injections replace a single injection event with multiple discrete injection events.

Injection events that occur after the main injection, often referred to as post-injections or after-injections, can be used to control PM emissions and/or to manage exhaust aftertreatment systems. The following definitions are used herein:
  (i) Post-injections occur very shortly after the main injection event while the process of combusting the main fuel injection is still underway and are intended to burn in-cylinder; and
  (ii) After-injections occur much later after the combustion process is complete and are not intended to burn in-cylinder.

One further definition of post-injection adopted herein is that it is an injection that contains less than 20% of the total fuel injected in an engine cycle.

After-injections are intended to introduce increased quantities of unburned hydrocarbons into the exhaust gas that exits an engine cylinder for diesel particulate filter regeneration, $NO_x$ adsorber regeneration or lean $NO_x$ catalysis, i.e. reduction of $NO_x$ using hydrocarbons as reductant instead of a nitrogenous reductant.

To thermally manage the emissions control devices in the exhaust line of the system, the present invention adopts a pre-programmed post-injection strategy, i.e. to raise the temperature of the first honeycomb substrate immediately following key-on/cold start.

Additionally, where the first honeycomb substrate comprises one or more substantially rhodium-free PGM and with or without additional heating provided by the electrically heatable element, the central processing unit of the engine control unit can be pre-programmed, when in use and following an initial step of heating the first honeycomb substrate using the post-injection strategy, to follow an after-injection strategy—either immediately following completion of the post-injection warm-up strategy or at intervals during a duty cycle of the vehicle when the engine control unit through sensor e.g. thermocouple input deems that additional heating in the exhaust line is required. The post-injection strategy is intended effectively to raise the exhaust gas temperature in the catalysed second honeycomb substrate and/or additional components, e.g. a third emissions control device, in the exhaust line downstream of the catalysed second honeycomb substrate. That is, where the first honeycomb substrate comprises one or more substantially rhodium-free PGM, exothermic combustion of after-injected hydrocarbons on the first honeycomb substrate can be used to heat the catalysed second honeycomb substrate and any third or subsequent emissions control devices in the system such as a SCR catalyst or SCR catalysed filter located downstream from the catalysed second honeycomb substrate in combination with or substantially in the absence of the provision of additional heating by the electrically heatable element.

For further information on Fuel Injection, the reader is directed to the Technology Guide section of the DieselNet website, e.g. see the paper "Fuel Injection for Clean Diesel Engines" by Hannu Jääskeläinen.

In the system, the hydrocarbon adsorbent component in the first honeycomb substrate of the first emissions control device adsorbs unburned hydrocarbon at key-on/cold-start when the exhaust gas entering that device is below a pre-determined low temperature; depending on the exhaust gas composition and formulation of the hydrocarbon adsorbent component and any other catalyst components such as platinum group metals (PGMs) formulated with the hydrocarbon adsorbent component, the low temperature may be in the range of about 200° C. to about 250° C. At the same time, the engine control unit switches the heating activation state of the electrically heatable element of the downstream second emissions control device to "on" to begin heating the downstream catalysed second honeycomb substrate.

One of the important consequences of this combination of hydrocarbon adsorption upstream from the downstream catalysed second honeycomb substrate is that the reduction or substantial absence of unburned hydrocarbons in the exhaust gas stream entering the downstream catalysed second honeycomb substrate immediately after key-on/cold-start passively promotes the thermodynamic oxidation of nitrogen monoxide in the exhaust gas to nitrogen dioxide. This is because hydrocarbon and carbon monoxide compete with nitrogen monoxide for active sites on catalytic oxidation components such as platinum. In practice, in an exhaust gas comprising carbon monoxide, hydrocarbons and nitrogen monoxide, nitrogen oxide does not begin to be oxidised on an oxidation catalyst substrate until a significant proportion of the hydrocarbons and carbon monoxide are removed over an upstream portion of the substrate. Thus, nitrogen monoxide oxidation can be competitively reduced by the presence of hydrocarbons and carbon monoxide in the inlet exhaust gas stream.

By removing at least hydrocarbons from the inlet exhaust gas stream to the catalysed second honeycomb substrate in combination with active heating of the electrically heatable element, effective nitrogen monoxide oxidation in the catalysed second substrate is promoted much sooner after key-on/cold-start. Where in addition to the hydrocarbon adsorbent component, the first honeycomb substrate also comprises one or more substantially rhodium-free PGMs, carbon monoxide oxidation can also be conducted upstream from the catalysed second honeycomb substrate, thus further enhancing the efficiency of the nitrogen monoxide oxidation reaction on the catalysed second honeycomb substrate.

The significance of the promotion of nitrogen monoxide oxidation as soon after key-on/cold-start as possible is that an increased $NO_2:NO_x$ ratio can promote one or both of two downstream processes. The first such process is the conversion of compression ignition particulate matter trapped on a suitable filter using the so-called CRT® effect, i.e. $NO_2 + C \rightarrow CO + NO$. The second such process is the selective catalytic reduction (SCR) of oxides of nitrogen ($NO_x$) using a nitrogenous reductant or a precursor thereof as reductant. Promotion of this second such process is particularly preferred in the present invention.

In practicing the SCR process, the reaction paths favoured by the prevalent conditions that result in the desired reduction of $NO_x$ to $N_2$ are dependent, among other things, on the composition of the $NO_x$ component in the reactant gas composition as a whole. The three principal desired SCR reactions are as follows:

$$4NH_3 + 4NO + O_2 \rightarrow 4N_2 + 6H_2O; \quad (1)$$

$$4NH_3 + 2NO_2 + O_2 \rightarrow 3N_2 + 6H_2; \text{ and} \quad (2)$$

$$NO + NO_2 + 2NH_3 \rightarrow 2N_2 + 3/2H_2O \text{(the preferred so-called "fast SCR reaction")} \quad (3)$$

In practice, reactions (1)-(3) proceed in parallel, but where the $NO_x$ in the reactant gas is principally nitrogen monoxide (NO), reaction (1) is favoured, and where the $NO_x$ is mostly $NO_2$, reaction (2) is favoured. However, reaction (3) is favoured where the $NO_x$ composition is 50:50 $NO:NO_2$ (or a $NO_2:NO_x$ ratio of 0.5). This reaction has become known as the "fast SCR reaction" because it is kinetically quicker than either reaction (1) or (2). What is not widely known is that reaction (3) is promoted at lower temperatures than either reaction (1) or (2).

So, where nitrogenous reductant such as ammonia or a precursor thereof such as urea is introduced into exhaust gas containing an enhanced amount of $NO_2$ downstream from the catalysed second honeycomb substrate of the inventive system soon after key-on/cold-start and upstream from a SCR catalyst, $NO_x$ conversion can be promoted on the SCR catalyst sooner in the system thereby obtaining lower $NO_x$ emissions over a relevant test cycle as a whole.

The electrically heatable element in the second emissions control device of the invention can also maintain the temperature of the catalysed second honeycomb substrate at or above its effective operating temperature when exhaust gas temperatures start to decrease during a vehicular duty cycle, such as during vehicular idling, or when the compression ignition engine has been temporarily stopped, e.g. during a so-called "stop-start" event.

According to a second aspect, the invention provides a vehicle comprising a system according to the first aspect of the invention.

According to a third aspect, the invention provides a method for treating an exhaust gas stream containing unburned hydrocarbons and oxides of nitrogen ($NO_x$) emitted from a vehicular compression ignition engine following key-on/cold-start, which method comprising the steps of:

a. post-injecting hydrocarbons in one or more cylinders of the engine to raise the temperature of the first honeycomb substrate immediately following key-on/cold start;

b. adsorbing unburned hydrocarbons in the exhaust gas stream from step a. onto a hydrocarbon adsorbent component of a first honeycomb substrate at temperatures at or below a low temperature and simultaneously oxidising nitrogen monoxide (NO) in the exhaust gas stream to nitrogen dioxide ($NO_2$) on a catalysed second honeycomb substrate disposed downstream from the first honeycomb substrate, wherein the catalysed second honeycomb substrate comprises a substantially rhodium-free platinum group metal (PGM) comprising platinum;

c. thermally desorbing hydrocarbons from the hydrocarbon adsorbent component of the first honeycomb substrate at a temperature above the low temperature;

d. heating an electrically heatable element disposed downstream from the first honeycomb substrate to heat the catalysed second honeycomb substrate disposed downstream from the electrically heatable element to a temperature at or above the unburned hydrocarbon oxidation light-off temperature ($T_{50}$) of the catalysed second honeycomb substrate; and e. catalytically converting the desorbed unburned hydrocarbons on the catalysed second honeycomb substrate.

The catalysed second honeycomb substrate of step b. can be substantially free of hydrocarbon adsorbent material, such as substantially free of zeolite.

Any reference to treating or converting an exhaust gas component produced by a compression ignition engine encompasses treating (e.g. oxidising) carbon monoxide (CO) and hydrocarbons (HCs) in the exhaust gas, such as by oxidising carbon monoxide (CO), hydrocarbons (HCs) and nitric oxide (NO).

BRIEF DESCRIPTION OF THE DRAWINGS

FIG. 1 schematically illustrates the general configuration of a system embodiment (2) of the present invention comprising a vehicular compression (diesel) ignition engine (1) and an exhaust line (3) therefor. In the exhaust line (3) a first emissions control device comprising a metal foil honeycomb substrate (5) comprises a zeolite, e.g. beta zeolite, hydrocarbon adsorbent and optionally one or more substantially rhodium-free PGM. Reference numeral (20) is an engine control unit (ECU) comprising a pre-programmed central processing unit (CPU) which performs basic control of the engine such as fuel injection control. At key-on/cold-start the ECU controls fuel injection to include post-injection to heat the exhaust line to a temperature where emissions control devices in the exhaust line are heated to above their respective light-off temperatures ($T_{50}$), which can take several minutes to achieve. Post-injected hydrocarbons are adsorbed in the first honeycomb substrate (5) at below about 200° C.

At key-on/cold-start, the ECU also turns the heating activation state of the metal foil electrically heatable element (7a) to "on" at switch (8) powered by battery (9) so that a downstream catalysed second metal foil honeycomb substrate (7b) coated with a substantially rhodium-free PGM washcoat is rapidly heated (taking up to about 1 minute) by radiation, conduction and/or convection heating to light-off temperatures above the catalyst's hydrocarbon and nitric oxide oxidation light-off temperature. The electrically heatable element (7a) and downstream catalysed second honeycomb substrate (7b) are components of a second emissions control device housed within a cylindrical metal sleeve, or housing, including electrical connections for the electrically heatable element (7a), of the kind disclosed in U.S. Pat. No. 6,513,324. The electrically heatable element (7a) can be catalysed with the same washcoat as is coated on the catalysed second honeycomb substrate (7b).

The length "L" in the exhaust system between the downstream end of the first emissions control device (5) and the second emissions control device (7) is variable depending on OEM system design but allows for an electrically isolating gap between the first honeycomb substrate (5) and the electrically heatable element (7a). For example, for ease of packaging the first emissions control device can be located at from 5 to 150 millimetres upstream from the electrically heatable element of the second emissions control device with no other emissions control device located in the gap therebetween.

Nitric oxide (NO) is oxidised to nitrogen dioxide ($NO_2$) on the catalysed second honeycomb substrate (7b) in exhaust gas containing lower quantities of post-injected hydrocarbons than enter the first honeycomb substrate (7a). Where the first honeycomb substrate (5) is catalysed with one or more rhodium-free PGMs, the NO oxidation is done more efficiently still in exhaust gas containing less carbon monoxide than enters the first honeycomb substrate (5).

As a result of NO oxidation on the catalysed second honeycomb substrate Exhaust gas comprising a total $NO_x$ composition with increased $NO_2/NO_x$ compared with exhaust gas entering the second emissions control device (7) passes downstream from the second emissions control device. Urea (10) contained in reservoir (12) is injected via injector (14) into exhaust gas between the second emissions control device (7) and a third emissions control device (22) under control of a valve (16) and ECU (20). The third emissions control device (22) is a catalysed third honeycomb substrate, which is either a flow-through honeycomb substrate or a wall-flow filter, coated with a selective catalytic reduction catalyst, e.g. an aluminosilicate CHA zeolite promoted with copper or an aluminosilicate AEI zeolite promoted with copper. Urea injection is controlled so that injection is done when the third emissions control device (22) is at or above its $NO_x$ conversion light-off temperature. The catalysed third honeycomb substrate of the third emissions control device (22) can include an ammonia slip catalyst coating (24) in a zone of substantially uniform axial length coated on the downstream end of the substrate. Exhaust gas exiting the third emissions control device is exhausted to atmosphere via tail pipe (26).

Post-injected hydrocarbons adsorbed on the first honeycomb substrate (5) are released at above about 200° C. and are combusted on the lit-off catalysed second honeycomb substrate (76) together with other hydrocarbons in the exhaust gas that were not adsorbed on the first honeycomb substrate (5).

Following the above regime, which takes place after key-on/cold-start, the system is controlled by ECU (20) including actuation of the electrically heatable element (7a) and post- and/or after-injection of hydrocarbons in one or more cylinders of the engine inter alia to maintain an exhaust gas temperature at the inlet to the third emissions control device (22) of approximately 200° C. to 300° C.

The system as a whole is able to achieve Worldwide Harmonised Light Vehicle Test Cycle (WLTC) and/or REAL Driving Emissions Test Cycle emission standards following key-on/cold-start.

The efficacy of this system can be shown by computer modelling, for example.

DETAILED DESCRIPTION OF THE INVENTION

The first honeycomb substrate can comprise one or more substantially rhodium-free PGM. Preferably, the first honeycomb substrate comprises both platinum and palladium, preferably in a weight ratio of platinum to palladium in the first honeycomb substrate is 4:1>1:1, most preferably 4:1≥2:1 in order to promote rapid achievement of cold-start light-off temperatures.

By electrically heating the catalysed second honeycomb substrate, the catalysed second honeycomb substrate is rapidly brought up to its effective temperature (e.g. its light-off temperature, defined herein as the temperature at which the catalyst catalyses a relevant conversion reaction at or above 50% efficiency, also referred to as "$T_{50}$"). This occurs relatively much more rapidly than by relying on the thermal heat transfer by convection from the exhaust gas passing through the catalyst to the substrate. Where the first honeycomb substrate comprises one or more substantially rhodium-free PGMs, the first honeycomb substrate can also start to catalyse exothermic reactions (e.g. oxidation of CO and/or hydrocarbons) when it has reached its effective temperature. Heat generated in the first honeycomb substrate can assist in maintaining the downstream catalysed second honeycomb substrate at above its effective operating temperature, thereby allowing the engine control unit to switch the heating activation state of the electrically heatable element to "off" during periods when the system determines, e.g. by appropriately located sensors such as thermocouples and feedback loop arrangements therefrom.

The system according to the first aspect of the invention comprises a vehicular compression ignition engine, particularly a diesel engine. The temperature of exhaust gases produced by compression ignition (diesel) engines is generally lower than the temperature of exhaust gases produced by spark-ignition engines (e.g. gasoline spark-ignition engines) of the same capacity.

In the system of the first aspect of the invention, the catalysed second honeycomb substrate has at least two principal purposes. One purpose is to oxidise nitrogen monoxide to nitrogen dioxide. As discussed hereinabove, nitrogen monoxide oxidation in the catalysed second honeycomb substrate is promoted in the system of the present invention by adsorbing unburned hydrocarbons in the upstream first honeycomb substrate immediately following key-on/cold-start.

Another purpose is the oxidation of excess hydrocarbons in the exhaust gas entering the catalysed second honeycomb substrate including hydrocarbon thermally desorbed from the hydrocarbon adsorbent component in the first honeycomb substrate at a temperature above the low temperature. For this purpose, the catalysed second honeycomb substrate preferably comprises both platinum and palladium, because such combination is more active for hydrocarbon oxidation. Preferred weight ratios of Pt:Pd for this purpose are 6:1≥2:1.

Of course, where the first honeycomb substrate comprises one or more substantially rhodium-free PGM, such as both platinum and palladium, such catalyst can also oxidise some of the hydrocarbons thermally desorbed from the hydrocarbon adsorbent component in the upstream first honeycomb substrate and the duty of the catalysed second honeycomb substrate can be directed to favour the purpose of oxidation of nitrogen monoxide. Preferred weight ratios of Pt:Pd for oxidising nitrogen monoxide in the catalysed second honeycomb substrate are platinum-rich, even platinum as the only PGM.

It is possible, therefore, to define the PGM composition of the catalysed second honeycomb substrate to embrace both the principal purposes of the catalysed second honeycomb substrate described hereinabove by the Pt:Pd weight ratio of 1:0>3:2, depending on the presence or absence of one or more substantially rhodium-free PGM on the upstream first honeycomb substrate, wherein—where present—the weight ratio of platinum to palladium present in the catalysed second honeycomb substrate is greater than in the first honeycomb substrate.

It is also possible for the catalysed second honeycomb substrate to comprise a hydrocarbon adsorbent material, although this is less preferred.

The catalysed second honeycomb substrate can be catalysed in a zoned arrangement, i.e. a first, upstream zone of substantially uniform axial length and a second, downstream zone of substantially uniform axial length, wherein the first, upstream zone comprises both platinum and palladium at a weight ratio of 1:0>2:1 and the second, downstream zone comprises platinum. In this arrangement, the first, upstream zone can have a Pt:Pd weight ratio preferred for the hydrocarbon oxidation purpose of the catalysed second honeycomb substrate discussed hereinabove; and the second, downstream zone can have a Pt:Pd weight ratio preferred for the nitrogen monoxide oxidation purpose of the catalysed second honeycomb substrate discussed hereinabove. The first upstream zone also preferably does not comprise any hydrocarbon adsorbent material, such as a zeolite.

Typically, the first, upstream zone is a first upstream washcoat zone and has an axial length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%). It is preferred that the axial length of the first, upstream washcoat zone is greater than the axial length of the second, downstream washcoat zone.

The second, downstream zone is generally a second downstream washcoat zone and typically has an axial length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Preferably the first, upstream washcoat zone and the second downstream washcoat zone are contiguous, without a gap therebetween or with a slight overlap caused by manufacturing tolerances where the substrate is coated from an upstream end followed by a coating applied from the downstream end. In this regard, it is preferred that the overlap is caused by the second, downstream washcoat zone slightly overlapping the first, upstream washcoat zone.

Preferably, the electrically heatable element comprises a PGM composition the same as the catalysed second honeycomb substrate or the same as the first upstream zone of the catalysed second honeycomb substrate.

Further preferably, the electrically heatable element does not comprise a hydrocarbon adsorbent material, such as a zeolite.

The present invention envisages at least two specific embodiments. In a first specific embodiment, a total PGM loading per unit volume in the first honeycomb substrate is less than a total PGM loading per unit volume in the catalysed second honeycomb substrate. This definition includes the possibility that the first honeycomb substrate contains no, or substantially no, PGM loading at all. In this embodiment, the higher PGM loading in the catalysed second honeycomb substrate is intended to oxidise hydrocarbons thermally desorbed from the hydrocarbon adsorbent component in the upstream first honeycomb substrate at a temperature above the low temperature. Combustion of desorbed hydrocarbons is exothermic and so heat generated from the combustion of desorbed hydrocarbons on the downstream catalysed second honeycomb substrate can increase the temperature in downstream catalytic components, such as a catalysed soot (wall-flow) filter (CSF), or preferably a SCR catalyst, so that such downstream emissions control devices in turn reach their own light-off temperatures more rapidly.

[In this field of art it is common general knowledge that dimensions of catalyst load are defined relative to the volume of a substrate, such as a honeycomb substrate, of which the catalyst is a part. This convention is followed as a kind of "fiction", because the honeycomb substrate is not a solid geometric part, such as a cylinder, but a part comprising channels extending therethrough, which channels each being defined by porous channel walls. That is, the convention ignores a "true" volume of a honeycomb substrate, i.e. one which takes into account the volume of the solid structure of the honeycomb structure, but instead applies the volume dimension as if the honeycomb substrate were a solid geometric part.

Additionally, it is also a convention adopted in this field of art that the mass of a catalyst component present in relatively small quantities per unit volume, such as PGMs, are quoted relative to a larger volume so that the mass figure is more readily quantifiable as opposed to being of the order of thousandths ($10^{-3}$) or millionths ($10^{-6}$) to the power ten. So, for relatively small component quantities, the volume parameter adopted in the art is that of cubic feet ($ft^3$) or the SI unit litres (I). Where relatively large quantities of component by mass are present, e.g. the amount of catalyst washcoat coated on the honeycomb substrate, the volume parameter adopted is often the cubic inch ($in^3$) or, again, the SI unit of the litre (I).

Finally, this field of art has also adopted a seemingly odd convention of defining a mass per unit volume parameter of catalyst components etc. which mixes a SI unit of mass with an Imperial (i.e. non-SI) unit for volume. Thus, there is a convention in this field of art to define catalyst component or washcoat loadings e.g. on a honeycomb substrate as "grams per cubic foot" ("$g/ft^3$", also written as the equivalent "$gft_{-3}$") or "grams per cubic inch" ("$g/in^3$" or "$gin^{-3}$")].

In the absence of one or more substantially rhodium-free PGM on the first honeycomb substrate, it is preferred that the system does not use after-injection strategy to increase the temperature in the exhaust system downstream from the first honeycomb substrate in addition to the post-injection strategy used at key-on/cold-start. The central processing unit of the engine control unit of the invention is pre-programmed to receive inputs from numerous physical sensors in the system to control exhaust aftertreatment and report on on-board diagnostics including one or more of temperature sensors, mass air flow sensors, oxygen sensors, $NO_x$ sensors, pressure sensors soot sensor. If, as a result of receiving such sensor input the engine control unit requires an increase in the temperature of one or more emission control devices downstream of the first honeycomb substrate, the engine control unit can switch the heating activation state of the electrically heatable element to "on" for this purpose.

However, in a second specific embodiment of the system of the invention, a total PGM loading per unit volume in the first honeycomb substrate is more than a total PGM loading per unit volume in the catalysed second honeycomb substrate. In this case, following initial heat-up of the first honeycomb substrate by the post-injection strategy to above the low temperature, the central processing unit of the engine control unit is preferably pre-programmed to use an in-cylinder after-injection strategy so that hydrocarbons are combusted on one or more substantially rhodium-free PGM on the first honeycomb substrate, thereby to increase temperature in the exhaust line downstream from the first honeycomb substrate.

The design choice of the Original Equipment Manufacturer (OEM) to select the first specific embodiment, the second specific embodiment or an intermediate position therebetween, i.e. wherein the first honeycomb substrate comprises one or more substantially rhodium-free PGM wherein a total PGM loading per unit volume in the first honeycomb substrate is less than a total PGM loading per unit volume in the catalysed second honeycomb substrate, will depend on a number of factors relating to the system calibration including the displacement of the engine, the intended performance level of the engine and the pre-programming of engine mapping and virtual sensor algorithms in the central processing unit of the engine control unit. However, switching the heating activation state of the electrically heatable element to "on" is generally more energy intensive—and so generates more $CO_2$—than direct combustion of hydrocarbons on an emissions control device, partly because the energy in hydrocarbon fuel must first be transformed into electrical energy before it is used to heat the electrically heatable element, with attendant inefficiencies in this transformation. This is true even where electrical energy can be recovered through such in-vehicle processes as regenerative braking.

Therefore, Applicant believes that OEM calibration design will favour systems wherein after-injection strategies are used to minimise direct electric heating of the electrically heatable element during a vehicle duty cycle for any period other than the period immediately following key-on/cold start. For at least this reason, Applicant prefers systems wherein the first honeycomb substrate includes one or more substantially rhodium-free PGM, most preferably where the total PGM loading per unit volume in the first honeycomb substrate is more than the total PGM loading per unit volume in the catalysed second honeycomb substrate.

In this second specific embodiment, wherein the total PGM loading per unit volume in the first honeycomb substrate is more than the total PGM loading per unit volume in the catalysed second honeycomb substrate, the total loading of PGM in the catalysed first honeycomb substrate is >100 $gft^{-3}$ and the total loading of PGM in the catalysed second honeycomb substrate is ≤25% that of the catalysed first honeycomb substrate.

Preferably, a volume of the first honeycomb substrate is less than a volume of the catalysed second honeycomb substrate, because such arrangement is more easily packaged for location on a light duty vehicle.

The first honeycomb substrate and optionally the catalysed second honeycomb substrate comprises a hydrocarbon adsorbent component. The hydrocarbon adsorbent component in each case may be selected from a zeolite, active charcoal, porous graphite and a combination of two or more thereof. It is preferred that the hydrocarbon adsorbent in the first honeycomb substrate and, where present, the catalysed second honeycomb substrate is a zeolite. More preferably, the zeolite is a medium pore zeolite (e.g. a zeolite having a maximum ring size of eight tetrahedral atoms) or a large pore zeolite (e.g. a zeolite having a maximum ring size of ten tetrahedral atoms). Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is most preferably ZSM-5, a beta zeolite or a Y zeolite, particularly beta zeolite.

The first honeycomb substrate can be ceramic comprising extruded hydrocarbon adsorbent component.

When the first honeycomb substrate comprises a hydrocarbon adsorbent component, then typically the total amount of hydrocarbon adsorbent is 0.05 to 2.2 g in$^{-3}$, particularly 0.10 to 1.2 g in$^{-3}$, more particularly 0.2 to 1.0 g in$^{-3}$.

The second emissions control device comprises an electrically heatable element. The second emissions control device generally comprises a single electrically heatable element. The electrically heatable element may be coated with a washcoat comprising one or more substantially rhodium-free PGM and one or more refractory oxide support material. The electrically heatable element typically comprises an electrical power connection, preferably at least two electrical power connections, more preferably only two electrical power connections. Each electrical power connection may be electrically connected to the electrically heatable element and an electrical power source. The electrically heatable element can be heated by Joule heating, where an electric current through a resistor converts electrical energy into heat energy.

The electrically heatable element is an electrically heating substrate, when in use.

In general, the electrically heatable element comprises a metal. The metal may be electrically connected to the electrical power connection or electrical power connections.

Preferably, the first honeycomb substrate is a flow-through substrate monolith, i.e. a honeycomb substrate wherein the channels are open at both ends thereof. The first honeycomb substrate can also be filter, such as a wall-flow filter or a partial filter but is preferably a wall-flow filter. Preferably, the catalysed second honeycomb substrate is a flow-through substrate monolith. The catalysed second honeycomb substrate can be a wall-flow filter. Preferably, the electrically heatable element is made from a metal foil.

In general, the partial filter substrate monolith has a plurality of walls that define the boundaries of the channels. Typically, the collecting element is a plurality of deflections in the plurality of the walls. Each wall may have no deflections or one or more deflections. Each deflection acts as an obstruction to any particulate matter in the exhaust gas that flows through the substrate monolith. Each deflection may have a flap or a wing-like shape and, typically, each deflection projects outwards from (e.g. at an angle to) the plane of the wall. It is preferred that each deflection is combined with an opening in a wall of the substrate monolith. Each opening in a wall allows the exhaust gas to flow from one channel to a neighbouring channel. Partial filter substrate monoliths are disclosed in WO 01/80978 and EP 1057519.

A wall flow filter substrate monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

In a wall-flow filter substrate monolith, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate of the first and second honeycomb substrates may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

Preferably, there is an electrically isolating gap between the first honeycomb substrate and the electrically heatable element. For ease of packaging, preferably the first emissions control device is located at from 5 to 150 millimetres upstream from the electrically heatable element of the second emissions control device.

The first honeycomb substrate can be made from a ceramic, such as cordierite, or a metal foil. The catalysed second honeycomb substrate can be made from a ceramic, or a metal foil, but is preferably made from a metal foil. It is preferred that the metal electrically heatable element and the metal catalysed second honeycomb substrate of the second emissions control device are both housed within a unitary cylindrical sleeve.

In principle, any second emissions control device may be used. Examples of devices suitable for use as second emission control devices comprising an electrically heatable element are described in U.S. Pat. Nos. 4,300,956, 5,146,743 and 6,513,324.

Typically, the electrically heatable element for use in the system according to the present invention is an electrically heatable honeycomb substrate, when in use.

The second emissions control device may comprise a metal honeycomb monolith substrate. The metal honeycomb monolith substrate may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable element, the metal honeycomb monolith substrate and/or the corrugated metal sheet or foil may comprise an aluminium ferritic steel, such as Fecralloy®.

The electrically heatable element may comprise a heating disk. In general, the heating disk is wound to avoid an electrical short circuit from the anode to cathode.

In general, the cell density of the electrically heatable element is lower than the cell density of the catalysed second honeycomb substrate.

The electrically heatable element may have a cell density of 50 to 200 cells per square inch (cpsi), preferably 75 to 175 cpsi.

Typically, the axial length of the electrically heatable element is less than the axial length of the substrate of the catalysed second honeycomb substrate. The axial length of the electrically heatable element may be less than 15% of the axial length of the substrate of the catalysed second honeycomb substrate. It is preferred that the axial length of the electrically heatable element is less than 14%, such as less than 13% (e.g. less than 10%), of the axial length of the substrate of the catalysed second honeycomb substrate.

Preferably, the system according to the first aspect of the invention does not comprise secondary air supply for supplying air into exhaust gas carried in the exhaust line between the first honeycomb substrate and the electrically heatable element/catalysed second honeycomb substrate.

The electrically heatable element may be coated with a washcoat comprising one or more substantially rhodium-free PGM and one or more refractory oxide support material. This washcoat can be directly disposed on a surface of the electrically heatable element. However, according to a preferred feature of the present invention, the catalysed second honeycomb substrate made from a metal foil and, where present, catalyst coating on the metal foil electrically heatable element, may be coated with a first washcoat layer consisting of refractory oxide support material and no PGM and then a washcoat comprising the PGM and a refractory oxide support material coated in a layer overlying the first washcoat layer. The benefit of this arrangement is that metal foil electrically heatable elements and metal foil honeycomb substrates disposed downstream therefrom, and part of the same emissions control device as an electrically heatable element, reach light-off temperatures much earlier than conventional systems that do not include electrically heatable elements and use ceramic honeycomb substrates and which typically have square section channels extending therethrough, relying on heat transfer from the exhaust gas alone. This means that the catalytic activity of the catalysed second metal foil honeycomb substrate in the system of the present invention and, where present, the catalysed electrically heatable element is kinetically limited for only a short period of time because of the reliable and accelerated heating of the electrically heatable element (possibly less than 1 minute). Once lit-off, catalytic activity is then limited by mass transfer.

By first coating the channels of a metal foil honeycomb substrate, which is the preferred honeycomb substrate of the catalysed second honeycomb substrate with a non-PGM containing refractory oxide washcoat layer, the coating as a whole is optimised for improved mass transfer. This is because the channels of the metal foil honeycomb substrates are typically formed from winding together sheets of alternately corrugated and flat metal foil. This arrangement creates channels that are broadly triangular in cross-section and having acute angles in two corners of the channel cross-section where the corrugated foil layer contacts a flat foil layer. If a PGM washcoat is coated as a first layer along these channels, part of the washcoat becomes "buried" in "deep" fillets in the recesses of the acute angles at these two corners. Hence, the active sites in PGM-containing coatings located within these fillets become catalytically mass transfer limited. By first coating the channels with a relatively cheap, PGM-free refractory oxide layer, these deep recesses are first filled and the PGM-containing washcoat can then be applied as a second layer on top of the first coating layer thus improving mass transfer to the active sites and making more efficient use of the expensive platinum group metal active catalytic component.

Generally, the second honeycomb substrate is catalysed by coating the honeycomb substrate with a catalytic washcoat slurry to form a washcoat layer on the channels thereof. Methods of preparing and laying down washcoat slurries are known in the art and include preparing an aqueous suspension of a particulate refractory oxide support material and aqueous salts of the PGMs.

The refractory oxide support material may be selected from the group consisting of alumina, silica, titania, zirconia, ceria and a mixed or composite oxide thereof, such as a mixed or composite oxide of two or more thereof. For example, the refractory oxide support material may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The refractory oxide support material may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof. The inclusion of a dopant can thermally stabilise the refractory oxide support material. It is to be understood that any reference to "doped" in this context refers to a material where the bulk or host lattice of the refractory oxide support material is substitution doped or interstitially doped with a dopant. In some instances, small amounts of the dopant may be present at a surface of the refractory oxide support material. However, most of the dopant will generally be present in the body of the refractory oxide.

When the refractory oxide support material is doped, the total amount of dopant is 0.25 to 5% by weight, preferably 0.5 to 3% by weight (e.g. about 1% by weight) of the refractory oxide support material.

When the refractory oxide support material comprises, or consists essentially of, ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

It is preferred that the refractory oxide support material is selected from the group consisting of alumina, silica, ceria, silica-alumina, ceria-alumina, ceria-zirconia and alumina-magnesium oxide. More preferably, the refractory oxide is selected from the group consisting of alumina, ceria, silica-alumina and ceria-zirconia. The refractory oxide may be alumina or silica-alumina.

The refractory oxide support material of the washcoat for coating the catalysed second honeycomb substrate may comprise, or consist essentially of, a mixed oxide of alumina and a refractory oxide or a composite oxide of alumina and a refractory oxide, wherein the refractory oxide is selected from the group consisting of silica, titania, zirconia and ceria. It is preferred that the refractory oxide is silica.

When the refractory oxide support material comprises, or consists essentially of, a mixed oxide of alumina and a refractory oxide or a composite oxide of alumina and a refractory oxide, then preferably the support material (e.g. the mixed oxide or the composite oxide) comprises at least 50 to 99% by weight of alumina, more preferably 70 to 95% by weight of alumina, even more preferably 75 to 90% by weight of alumina.

The refractory oxide support material may comprise alumina or may consist essentially of alumina. The alumina can be $\alpha$-$A_2O_3$, $\beta$-$A_2O_3$, or $\gamma$-$Al_2O_3$. It is preferred that the alumina comprises, or consists essentially of, $\gamma$-$Al_2O_3$. The refractory oxide support material may comprise alumina doped with a dopant. The inclusion of a dopant can thermally stabilise alumina and, hence, the refractory oxide support material. It is to be understood that any reference to "doped" in this context refers to a material where the bulk or host lattice of the alumina is substitution doped or interstitially doped with a dopant. In some instances, small amounts of the dopant may be present at a surface of the alumina. However, most of the dopant will generally be present in the body of the alumina.

When the alumina is doped, then typically the total amount of dopant is 0.1 to 10% by weight (i.e. % by weight of the alumina). It is preferred that the total amount of dopant is 0.25 to 7.5% by weight, more preferably 0.5 to 5.0% by weight.

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprise, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, or cerium, or an oxide thereof, particularly silicon, or cerium, or an oxide thereof. More preferably, the dopant comprises, or consists essentially of, silicon, magnesium, or barium, or an oxide thereof; particularly silicon, or magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica. Alumina doped with a dopant can be prepared using methods known in the art or, for example, by a method described in U.S. Pat. No. 5,045,519.

When the alumina is alumina doped with silica, then the alumina is doped with silica in a total amount of 0.5 to 45% by weight (i.e. % by weight of the alumina), preferably 1 to % by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

The support material may comprise, or consist essentially of, an alkaline earth metal aluminate. The term "alkaline earth metal aluminate" generally refers to a compound of the formula $MAl_2O_4$ where "M" represents the alkaline earth metal, such as Mg, Ca, Sr or Ba. Such compounds generally comprise a spinel structure. These compounds can be prepared using conventional methods well known in the art or, for example, by using a method described in EP 0945165, U.S. Pat. No. 6,217,837 or U.S. Pat. No. 6,517,795.

Typically, the alkaline earth metal aluminate is magnesium aluminate ($MgAl_2O_4$), calcium aluminate ($CaAl_2O_4$), strontium aluminate ($SrAl_2O_4$), or barium aluminate ($BaAl_2O_4$), or a mixture of two or more thereof. Preferably, the alkaline earth metal aluminate is magnesium aluminate ($MgAl_2O_4$).

The support material may preferably comprise, or consist essentially of, alumina (e.g. $\gamma$-alumina), which is not doped. The inclusion of a dopant in the support material may decrease the catalytic activity of the composition.

Typically, the catalyst washcoat loading on the catalysed second substrate comprises an amount of the support material of 0.1 to 4.0 g in$^{-3}$ (e.g. 0.25 to 3.5 g in$^{-3}$), preferably 0.3 to 3.0 g in$^{-3}$, still more preferably 0.5 to 2.7 g in$^{-3}$, and even more preferably 0.6 to 2.5 g in$^{-3}$ (e.g. 0.75 to 2.3 g in$^{-3}$).

Where the electrically heatable element is also coated with washcoat, the washcoat loading on the electrically heatable element is less than the washcoat loading on the catalysed second honeycomb substrate.

In principle, the catalyst washcoat coating of the catalysed second honeycomb substrate (and, where present, the washcoat applied to the electrically heatable element) may comprise a plurality of support materials, including the first support material. However, it is generally preferred that the catalyst washcoat comprises a single support material.

Preferably, the catalysed second honeycomb substrate and, where present, catalyst coating on the metal foil electrically heatable element does not comprise a metal component having $O_2$ storage capability, such as cerium. The skilled reader will understand that just because a refractory oxide support material or a metal component supported thereon may be able to store $O_2$, this does not necessarily mean that the metal component and/or the refractory oxide support material possesses "$O_2$ storage capability". By "$O_2$ storage capability" herein, Applicant intends to define materials that are capable of functioning effectively as an oxygen storage component of a three-way catalyst for use in a gasoline exhaust system. Therefore, where a skilled person would consider $O_2$ storage in a refractory oxide support material and/or a metal component supported thereon to be de minimis or below the level of $O_2$ storage capable of use as an OSC in a three-way catalyst, such refractory oxide support material and/or metal component is not excluded by the definition "$O_2$ storage capability".

Generally, the substantially rhodium-free platinum group metal (PGM) of the catalysed second honeycomb substrate is selected from the group consisting of platinum, palladium ruthenium, iridium and osmium and a combination of two or more thereof. The PGM may comprise or consist essentially of platinum. The PGM may comprise or consist essentially of a combination of platinum and palladium Typically, the total amount of PGM in the catalysed second honeycomb substrate is 10 to 300 g ft$^{-3}$, more preferably 20 to 250 g ft$^{-3}$, still more preferably, 25 to 200 g ft$^{-3}$, and even more preferably 35 to 150 g ft$^{-3}$.

The washcoat composition of the catalysed second honeycomb substrate and, where present, the electrically heatable element, may further comprise an alkaline earth metal. The alkaline earth metal may be selected from magnesium (Mg), calcium (Ca), strontium (Sr), barium (Ba) or a combination of two or more thereof. The alkaline earth metal is preferably calcium (Ca), strontium (Sr), or barium (Ba), more preferably strontium (Sr) or barium (Ba), and most preferably the alkaline earth metal is barium (Ba). Applicant has found that alumina doped with silica supporting a rhodium-free PGM of Pt or both Pt and Pd promoted with barium shows improved CO and HC oxidation, as is described in Applicant's WO2014/080200. For at least this reason, this combined selection of components is preferred.

In the second embodiment described hereinabove, wherein the first honeycomb substrate also comprises a substantially rhodium-free PGM, preferably the PGM is coated in a washcoat comprising a refractory oxide support material for the PGM selected from any of those described in connection with the washcoat for the catalysed second honeycomb substrate, particularly the PGM promoted with barium supported on silica-doped alumina composition, together with the hydrocarbon adsorbent component. Where the first honeycomb substrate also comprises substantially rhodium-free PGM, the first honeycomb substrate can be referred to also as a "catalysed first honeycomb substrate".

Where the catalysed second honeycomb substrate is catalysed in a zoned arrangement, as described hereinabove, preferably, the first, upstream zone comprises a hydrocarbon adsorbent-free washcoat formulation as described hereinabove, particularly the preferred barium-containing washcoat composition. It is also preferred that this same washcoat composition is used to coat the electrically heatable element, where present.

The second, downstream zone, can be formulated for efficient NO oxidation. Applicant has found that excellent activity toward the oxidation of nitric oxide (NO) in an exhaust gas from a diesel engine can be obtained when manganese (Mn) is combined with platinum (Pt) in an oxidation catalyst. Platinum is expensive and is often included in oxidation catalysts in relatively large amounts for, amongst other things, its oxidation activity toward NO. The inclusion of manganese (Mn) in combination with platinum (Pt) may result in an improvement in NO oxidation activity or allow the use of a reduced amount of Pt to achieve a given level of NO oxidation. The oxidation catalyst also has good activity toward oxidising carbon monoxide (CO) and hydrocarbons (HCs) in an exhaust gas produced by a diesel engine.

That is, the catalysed second honeycomb substrate comprising a first, upstream zone comprising one or more substantially rhodium-free PGM, Ba and a silica-doped alumina refractory oxide support material and a second, downstream zone comprising Pt, Mn and a refractory oxide support material can be as described generally in Applicant's WO2015/110818.

The washcoat composition of the second, downstream zone of the catalysed second honeycomb substrate may further comprise a hydrocarbon adsorbent, which can be any of those described hereinabove in connection with the first honeycomb substrate, but is preferably ZSM-5, a beta zeolite or a Y zeolite.

When the second, downstream zone of the catalysed second honeycomb substrate comprises a hydrocarbon adsorbent, then typically the total amount of hydrocarbon adsorbent is 0.05 to 1.5 g in$^{-3}$, particularly 0.10 to 1.0 g in$^{-3}$, more particularly 0.2 to 0.8 g in$^{-3}$.

It is further preferred that the first and the catalysed second honeycomb substrate does not comprise rhodium (Rh) or NO$_x$ adsorbent quantities of an alkali metal (e.g. Li, Na, K) and an alkaline earth metal (e.g. Mg, Ca, Sr, Ba). For the avoidance of doubt, the catalyst washcoats of the present invention can contain oxidation promoting quantities of alkaline earth metals, particularly preferably barium. However, a NO$_x$ adsorber catalyst (NAC), also sometimes referred to as a NO$_x$ sorber catalyst or NO$_x$ trapping catalyst, is formulated to contain significantly higher quantities of alkaline earth metals for adsorbing NO$_x$ from lean exhaust gas, e.g. of the order of >500 gft$^{-3}$. Additionally, correct functioning of a NAC requires periodic enrichment with of the exhaust gas using after-injection strategies to regenerate the NO$_x$ adsorber and reduce released NO$_x$ to N$_2$ using hydrocarbons as reductant, i.e. lean NO$_x$ catalysis. This requires pre-programming of the central processing unit of the engine control unit. For the avoidance of any doubt, the central processing unit of the engine control unit of the system according to the invention is not pre-programmed for NO$_x$ adsorber regeneration.

Methods for preparing a washcoated first honeycomb substrate and second honeycomb substrate are known in the art. See, for example, Applicant's WO 99/47260, WO 2007/077462 and WO 2011/080525.

In general, in the second emissions control device, the electrically heatable element of the second emissions control device is typically separated from the catalysed second honeycomb substrate, such as by a gap. It is preferred that the gap is an electrically isolating gap between the electrically heatable element and the catalysed second honeycomb substrate. This is to prevent the second honeycomb substrate from being in electrical contact with the electrically heatable element, potentially causing a short circuit.

The gap may have a length of 1 mm to 50 mm, as measured in the direction of the axial length of the electrically heatable element and the catalysed second honeycomb substrate. It is preferred that the gap has a length of 1 mm to 10 mm. This allows heat to be readily transferred from the electrically heatable element to the catalysed second honeycomb substrate.

When the electrically heatable element is separated from the catalysed second honeycomb substrate, such as by a gap, then generally there is no intervening emissions control device between the electrically heatable element and the catalysed second honeycomb substrate (i.e. in the gap). The catalysed second honeycomb substrate directly follows the electrically heatable element.

The second emissions control device typically comprises a casing or sleeve, wherein the electrically heatable element and the catalysed second honeycomb substrate are disposed within the casing. The casing may have one or more marking to denote the inlet end and/or the outlet end of the emissions control device.

The casing may comprise an electrically insulating supporting element for each electrical power connection. Each electrical power connection of the first catalyst may pass through an electrically insulating supporting element.

The casing or sleeve may comprise or consist essentially of a metallic sleeve.

The system of the invention may further comprise an electrical power source. The electrical power source may be electrically connected to each electrical power connection (i.e. of the electrically heatable element).

There may be a switch connected between the electrical power source and an electrical power connection. The switch may allow electrical current to pass from the electrical power source to the first catalyst before the compression ignition engine has started (e.g. from 1 to 2 seconds before the compression ignition) or simultaneously with the start of the compression ignition engine.

The electrical power supply may be an 8 to 28-volt electrical power supply, preferably a 12 to 24-volt electrical power supply.

The exhaust system may comprise a temperature sensor, preferably a plurality of temperature sensors. Each temperature sensor may be a thermocouple.

A temperature sensor (i.e. a first temperature sensor) may be located upstream of the electrically heatable element and/or the first honeycomb substrate. This temperature sensor may be electrically connected to a switch. For example, it may be electrically connected to a switch, such that the switch closes to actuate heating of the electrically heatable element and/or initiate heating derived from application of after-injection strategy when the temperature sensor detects a temperature of the exhaust gas below a temperature limit (i.e. a first temperature limit). The sensor may trigger electrical heating of the electrically heatable element when the exhaust gas temperature is below the effective temperature of the electrically heatable element.

A further temperature sensor (i.e. a second temperature sensor) may be located between the electrically heatable element and the catalysed second honeycomb substrate. This temperature sensor may be electrically connected to a switch. For example, it may be electrically connected to a switch, such that the switch opens when the temperature sensor detects a temperature of the exhaust gas above a temperature limit (e.g. a second temperature limit). When the switch is opened, the electrical circuit between the electrical power source and the electrically heatable element is broken. The sensor may stop electrical heating of the electrically heatable element once it has reached a certain temperature, such as the temperature at which the electrically heatable element is effective.

The or each temperature sensor may be electrically connected to the engine control unit for the purposes of feedback control for thermal management in the system. The or each temperature sensor may provide information for on-board diagnostic (OBD) purposes.

The first emissions control device of the invention may be locatable between 0.1 metres and 10 metres, such as 0.5 metres to 4 metres, as measured by gas flow length, from the exit of the exhaust gas from the engine (e.g. the outlet of an engine manifold).

The system according to the first aspect of the invention may comprise a third emissions control device, which is a third honeycomb substrate comprising an ammonia-selective catalytic reduction (SCR) catalyst disposed downstream from the second emissions control device.

The third honeycomb substrate can be a flow-through honeycomb substrate or a filter, preferably a wall-flow filter.

Where the system includes a SCR catalyst, either on a flow-through substrate or a filtering substrate, the system can comprise a source of nitrogenous reductant and/or a precursor thereof, such as urea, and an injector for injecting nitrogenous reductant and/or a precursor therefor into an exhaust gas flowing in the exhaust line downstream of the catalysed second honeycomb substrate and upstream of the third honeycomb substrate, dosing of which nitrogenous reductant or precursor thereof is controlled by the pre-programmed central processing unit.

The vehicle according to the second aspect of the invention can be powered by a hybrid electric motor and the compression ignition engine of the system according to the first aspect of the invention.

The compression ignition engine is preferably a ("straight") diesel engine, but can also be a dual-fuel diesel and compressed natural gas engine.

The vehicle typically comprises an electrical power source, such as an alternator and/or battery. It is preferred that the electrical power source for the first catalyst is the alternator and/or battery (e.g. of the vehicle).

The vehicle may be a light-duty diesel vehicle (LDV) as defined hereinabove or a heavy-duty diesel vehicle also as defined hereinabove but is preferably a light-duty diesel vehicle.

According to the third invention aspect, the electrically heatable element can heat the catalysed second honeycomb substrate at least during periods when the exhaust gas temperature at the inlet to the first honeycomb substrate is below the low temperature.

The method can further comprise the step of combusting hydrocarbons in the exhaust gas introduced into the exhaust gas by after-injecting hydrocarbons in one or more cylinders of the engine on one or more substantially rhodium-free PGM of the first honeycomb substrate to increase temperature in the catalysed second honeycomb substrate and/or any emissions control device downstream of the catalysed second honeycomb substrate.

The step of combusting hydrocarbons in the exhaust gas introduced into the exhaust gas by after-injecting hydrocarbons in one or more cylinders of the engine is preferably done after the completion of step d.

The method preferably further comprises the step of introducing a nitrogenous reductant and/or a precursor therefor into the exhaust gas stream downstream from the second catalysed honeycomb substrate and converting $NO_x$ in the exhaust gas stream containing ammonia with third honeycomb substrate comprising an ammonia-selective catalytic reduction catalyst.

The method according to the third aspect of the invention can be performed using a system according to the first aspect of the invention.

Definitions

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The acronym "PGM" as used herein refers to "platinum group metal". The term "platinum group metal" generally refers to the metals Ru, Rh, Pd, Os, Ir and Pt of the Periodic Table, particularly the metals Ru, Rh, Pd, Ir and Pt.

Any reference herein to an amount in units of g ft$^{-3}$ (grams per cubic foot) or g in$^{-3}$ (grams per cubic inch) etc. refer to the mean weight of a component per volume of the substrate.

The expression "consisting essentially" used herein limits the scope of a feature to its novel and basic features within the context of the defined element, e.g. specified materials or steps, and any other materials or steps that do not materially affect the basic characteristics of that feature, such as for example minor impurities. The expression "consisting essentially of" embraces the expression "consisting of".

The invention may also be defined according to one or more of the following definitions.

1. A system comprising:
   (i) a vehicular compression ignition engine comprising one or more engine cylinders and one or more electronically-controlled fuel injectors therefor;
   (ii) an exhaust line for the engine comprising:
   a first emissions control device comprising a first honeycomb substrate, which comprises a hydrocarbon adsorbent component; and
   a second emissions control device comprising an electrically heatable element and a catalysed second honeycomb substrate, which comprises a substantially rhodium-free platinum group metal (PGM) comprising platinum, wherein the electrically heatable element is disposed upstream from the catalysed second honeycomb substrate; and
   (iii) an engine control unit comprising a central processing unit pre-programmed, when in use, to control both a heating activation state of the electrically heatable element; and an injection timing strategy of the one or more electronically-controlled fuel injector to increase the temperature of at least the first emissions control device following key-on/cold-starting a vehicle comprising the system.
2. A system according to 1, wherein the first honeycomb substrate comprises one or more substantially rhodium-free PGM.
3. A system according to 2, wherein the first honeycomb substrate comprises both platinum and palladium.
4. A system according to 3, wherein a weight ratio of platinum to palladium in the first honeycomb substrate is 4:1>1:1.
5. A system according to any of 1 to 4, wherein the catalysed second honeycomb substrate comprises both platinum and palladium.
6. A system according to 5, wherein a weight ratio of platinum to palladium in the catalysed second honeycomb substrate is 1:0>3:2, wherein the weight ratio of platinum to palladium present in the catalysed second honeycomb substrate is greater than in the first honeycomb substrate.
7. A system according to 5 or 6, wherein the catalysed second honeycomb substrate comprises a first, upstream zone and a second, downstream zone, wherein the first, upstream zone comprises both platinum and palladium at a weight ratio of 1:0>2:1 and the second, downstream zone comprises platinum.
8. A system according to any of 2 to 7, wherein a total PGM loading per unit volume in the first honeycomb substrate is less than a total PGM loading per unit volume in the catalysed second honeycomb substrate.
9. A system according to 2 to 7, wherein a total PGM loading per unit volume in the first honeycomb substrate is more than a total PGM loading per unit volume in the catalysed second honeycomb substrate.
10. A system according to any of 1 to 9, wherein a volume of the first honeycomb substrate is less than a volume of the catalysed second honeycomb substrate.
11. A system according to any of 1 to 10, wherein the heating element comprises a PGM composition the same as the catalysed second honeycomb substrate or the same as the first upstream zone of the catalysed second honeycomb substrate.
12. A system according to any of 1 to 11, wherein the hydrocarbon adsorbent component is a zeolite.
13. A system according to any of 1 to 12, wherein the first honeycomb substrate is ceramic or is made from a metal foil.
14. A system according to claim 13, wherein the first honeycomb substrate is ceramic comprising extruded hydrocarbon adsorbent component.
15. A system according to any of 1 to 14, wherein the catalysed second honeycomb substrate is ceramic or is made from a metal foil, preferably metal foil.
16. A system according to any of 1 to 15, wherein the catalysed second honeycomb substrate, both the first honeycomb substrate and the catalysed second honeycomb substrate and optionally additionally the electrically heatable element are coated with a washcoat comprising the PGM and a refractory oxide support material.
17. A system according to 16, wherein the catalysed second honeycomb substrate is coated with a first washcoat layer consisting of refractory oxide support material and no PGM and a washcoat comprising the washcoat comprising the PGM and the refractory oxide support material is coated in a layer overlying the first washcoat layer.
18. A system according to any of 1 to 17, wherein the central processing unit is pre-programmed to switch the heating activation state of the electrically heatable element to "on" thereby to heat the catalysed second honeycomb substrate at least during periods when the exhaust gas temperature at the inlet to the first honeycomb substrate is below a predefined low temperature.
19. A system according to 18, wherein the predefined low temperature is within the range of about 200° C. to about 250° C.
20. A system according to any of 1 to 19 comprising a third emissions control device, which is an optionally catalysed particulate filter, preferably a wall-flow filter.
21. A system according to any of 1 to 20 comprising a third or further emissions control device, which is a third or further honeycomb substrate comprising an ammonia-selective catalytic reduction catalyst disposed downstream from the second emissions control device.
22. A system according to 21, wherein the third honeycomb substrate is a flow-through honeycomb substrate or a wall-flow filter.
23. A system according to 21 or 22 comprising a source of nitrogenous reductant and/or a precursor thereof and an injector for injecting nitrogenous reductant and/or a precursor therefor into an exhaust gas flowing in the exhaust line downstream of the catalysed second honeycomb substrate and upstream of the third honeycomb substrate, dosing of which nitrogenous reductant or precursor thereof is controlled by the pre-programmed central processing unit.
24. A system according to claim 20, 21, 22 or 23, wherein the central processing unit of the engine control unit is pre-programmed to control the system so that exhaust gas entering the third honeycomb substrate is between about 200° C. and about 300° C. for substantially all of a vehicle duty cycle, Worldwide Harmonised Light Vehicle Test Cycle (WLTC) and/or REAL Driving Emissions Test after the exhaust line has been heated following key-on/cold-start.
25. A vehicle comprising a system according to any of 1 to 24.
26. A vehicle according to 25 powered by a hybrid electric motor and the compression ignition engine of the system.
27. A method for treating an exhaust gas stream containing unburned hydrocarbons and oxides of nitrogen ($NO_x$) emitted from a vehicular compression ignition engine following key-on/cold-start, which method comprising the steps of:

a. post-injecting hydrocarbons in one or more cylinders of the engine to raise the temperature of the first honeycomb substrate immediately following key-on/cold start;

b. adsorbing unburned hydrocarbons in the exhaust gas stream from step a. onto a hydrocarbon adsorbent component of a first honeycomb substrate at temperatures at or below a low temperature and simultaneously oxidising nitrogen monoxide (NO) in the exhaust gas stream to nitrogen dioxide ($NO_2$) on a catalysed second honeycomb substrate disposed downstream from the first honeycomb substrate, wherein the catalysed second honeycomb substrate comprises a substantially rhodium-free platinum group metal (PGM) comprising platinum;

c. thermally desorbing hydrocarbons from the hydrocarbon adsorbent component of the first honeycomb substrate at a temperature above the low temperature;

d. heating an electrically heatable element disposed downstream from the first honeycomb substrate to heat the catalysed second honeycomb substrate disposed downstream from the electrically heatable element to a temperature at or above the unburned hydrocarbon oxidation light-off temperature ($T_{50}$) of the catalysed second honeycomb substrate; and e. catalytically converting the desorbed unburned hydrocarbons on the catalysed second honeycomb substrate.

28. A method according to 27, wherein the low temperature is within the range of about 200° C. to about 250° C.

29. A method according to 27 or 28, wherein the electrically heatable element heats the catalysed second honeycomb substrate at least during periods when the exhaust gas temperature at the inlet to the first honeycomb substrate is below the low temperature.

30. A method according to 27, 28 or 29 further comprising the step of combusting hydrocarbons in the exhaust gas introduced into the exhaust gas by after-injecting hydrocarbons in one or more cylinders of the engine on one or more substantially rhodium-free PGM of the first honeycomb substrate to increase temperature in the catalysed second honeycomb substrate and/or any emissions control device downstream of the catalysed second honeycomb substrate.

31. A method according to 30, wherein the step of combusting hydrocarbons in the exhaust gas introduced into the exhaust gas by after-injecting hydrocarbons in one or more cylinders of the engine is done after the completion of step d.

32. A method according to any of 27 to 31 comprising the step of introducing a nitrogenous reductant and/or a precursor therefor into the exhaust gas stream downstream from the second catalysed honeycomb substrate and converting $NO_x$ in the exhaust gas stream containing ammonia with third honeycomb substrate comprising an ammonia-selective catalytic reduction catalyst.

33. A method according to any of 27 to 32 performed using a system according to any of 1 to 26.

For the avoidance of any doubt, the entire content of any and all documents cited herein is incorporated by reference into the present application.

The invention claimed is:

1. A system comprising:
(i) a vehicular compression ignition engine comprising one or more engine cylinders and one or more electronically-controlled fuel injectors therefor;
(ii) an exhaust line for the engine comprising:
a first emissions control device comprising a first honeycomb substrate, which comprises a hydrocarbon adsorbent component that includes platinum and palladium;
a second emissions control device comprising an electrically heatable element and a catalysed second honeycomb substrate, which comprises a rhodium-free platinum group metal (PGM) comprising platinum, wherein the electrically heatable element is disposed upstream from the catalysed second honeycomb substrate and wherein both the electrically heatable element and the catalysed second honeycomb substrate are disposed downstream from the first honeycomb substrate, wherein a total PGM loading per unit volume in the first honeycomb substrate is more than a total PGM loading per unit volume in the catalysed second honeycomb substrate;
a third emissions control device, which is a third honeycomb substrate comprising an ammonia-selective catalytic reduction catalyst disposed downstream from the second emissions control device;
a source of nitrogenous reductant and/or a precursor thereof and an injector for injecting nitrogenous reductant and/or a precursor therefor into an exhaust gas flowing in the exhaust line downstream of the catalysed second honeycomb substrate and upstream of the third honeycomb substrate; and
one or more temperature sensors located: upstream of the electrically heatable element and/or upstream of the first honeycomb substrate; and between the electrically heatable element and the catalysed second honeycomb substrate; and
(iii) an engine control unit comprising a central processing unit pre-programmed, when in use, to control both a heating activation state of the electrically heatable element; and an injection timing strategy of the one or more electronically-controlled fuel injector to increase the temperature of at least the first emissions control device following key-on/cold-starting a vehicle comprising the system, wherein the one or more temperature sensors are electrically connected to the engine control unit for feedback control in the system, wherein dosing of which nitrogenous reductant or precursor thereof is controlled by the pre-programmed central processing unit.

2. The system according to claim 1, wherein a weight ratio of platinum to palladium in the first honeycomb substrate is in the range of 4:1 to 1:1.

3. The system according to claim 1, wherein the catalysed second honeycomb substrate comprises both platinum and palladium.

4. The system according to claim 3, wherein a weight ratio of platinum to palladium in the catalysed second honeycomb substrate is in the range of 1:0 to 3:2, wherein the weight ratio of platinum to palladium present in the catalysed second honeycomb substrate is greater than in the first honeycomb substrate.

5. The system according to claim 3, wherein the catalysed second honeycomb substrate comprises a first, upstream zone and a second, downstream zone, wherein the first, upstream zone comprises both platinum and palladium at a weight ratio in the range of 1:0 to 2:1, and the second, downstream zone comprises platinum.

6. The system according to claim 1, wherein the electrically heatable element comprises a PGM composition the same as the catalysed second honeycomb substrate or the same as the first, upstream zone of the catalysed second honeycomb substrate.

* * * * *